US008350616B1

(12) United States Patent
Fu et al.

(10) Patent No.: US 8,350,616 B1
(45) Date of Patent: Jan. 8, 2013

(54) VARIABLE OUTPUT CHARGE PUMP CIRCUIT

(76) Inventors: Robert Fu, Cupertino, CA (US); Tien-Min Chen, San Jose, CA (US)

( * ) Notice: Subject to any disclaimer, the term of this patent is extended or adjusted under 35 U.S.C. 154(b) by 787 days.

(21) Appl. No.: 10/712,522

(22) Filed: Nov. 12, 2003

(51) Int. Cl.
*G05F 1/10* (2006.01)
*G05F 3/02* (2006.01)

(52) U.S. Cl. ........................ 327/536; 327/534
(58) Field of Classification Search .......... 327/534–537, 327/589; 363/59–60; 365/226
See application file for complete search history.

(56) References Cited

U.S. PATENT DOCUMENTS

| | | | | |
|---|---|---|---|---|
| 5,446,697 A * | 8/1995 | Yoo et al. | | 365/226 |
| 5,889,664 A * | 3/1999 | Oh | | 363/60 |
| 5,943,271 A * | 8/1999 | Fujita | | 365/189.09 |
| 6,011,743 A * | 1/2000 | Khang | | 365/226 |
| 6,023,186 A * | 2/2000 | Kuroda | | 327/534 |
| 6,031,411 A * | 2/2000 | Tsay et al. | | 327/536 |
| 6,249,445 B1 * | 6/2001 | Sugasawa | | 363/60 |
| 6,333,571 B1 * | 12/2001 | Teraoka et al. | | 307/125 |
| 6,737,907 B2 * | 5/2004 | Hsu et al. | | 327/536 |
| 6,765,428 B2 * | 7/2004 | Kim et al. | | 327/534 |
| 6,836,177 B2 * | 12/2004 | Ito | | 327/536 |
| 6,891,426 B2 * | 5/2005 | Zeng et al. | | 327/536 |
| 6,901,009 B2 * | 5/2005 | Natori | | 365/185.18 |
| 2002/0131303 A1 * | 9/2002 | Martines et al. | | 365/185.18 |

FOREIGN PATENT DOCUMENTS

JP   2002142448 A  *  5/2002

\* cited by examiner

*Primary Examiner* — Quan Tra

(57) ABSTRACT

A drive frequency source with two selectable output frequencies connected to two charge pump arrays. A first array of basic charge pump units is connected to the first output frequency and a second array of basic charge pump units is connected to the output frequency. One or more of the basic charge pump units making up the aforementioned first and second charge pump arrays has an enable input allowing its output current contribution to be added or subtracted from the total array output. The output of the first array is coupled to a P-type substrate and the output of the second array is coupled to an N-well residing in the P-type substrate. A controller may be coupled to the drive frequency source for selecting the output frequencies, and an output monitor may be coupled between the array outputs and the controller to provide feedback.

19 Claims, 3 Drawing Sheets

VARIABLE OUTPUT CHARGE PUMP CIRCUIT

FIELD OF THE INVENTION

Embodiments of the present invention relate to circuits for providing operational voltages in complementary metal-oxide semiconductor (CMOS) circuits. In particular, embodiments of the present invention relate to a charge pump circuit with a variable output.

BACKGROUND ART

As the operating voltages for CMOS transistor circuits have decreased, variations in the threshold voltages for the transistors have become more significant. Although low operating voltages offer the potential for reduced power consumption, threshold voltage variations due to process and environmental variables often prevent optimum efficiency and performance from being achieved due to increased leakage currents.

Threshold voltage variations may be compensated for by body biasing. In typical CMOS transistors, the body of the transistor is connected to a supply rail (e.g., $V_{ss}$ for NMOS, and $V_{dd}$ for PMOS). In this configuration the transistor is often treated as a three terminal device.

Body biasing introduces a reverse bias potential between the bulk and the source of the transistor that allows the threshold voltage of the transistor to be adjusted electrically. The purpose of body biasing is to compensate for: 1) process variations; 2) temperature variations; 3) supply voltage variations; 4) changes in frequency of operation; and 5) changing levels of switching activity.

Whereas the typical CMOS transistor is a three-terminal device, the body biased CMOS transistor is a four-terminal device, and thus requires a more complex interconnect scheme. Connections for body biasing may be made on the substrate surface using conventional metal/dielectric interconnects similar to those used for typical gate, drain, and source connections, or they may be made using buried complementary well structures (e.g., buried N-well).

Prior Art FIG. 1 shows a conventional CMOS inverter 100. A P-type substrate 105 supports an NFET 110 and a PFET 120. The NFET 110 comprises a gate 112, source 113, and drain 114. The PFET 120 resides in an n-well 115, and comprises a gate 122, drain 123, and a source 124. Body bias can provided to the PFET 120 through a direct bias contact 135a, or by a buried n-well 125 using contact 135b. Similarly, body bias may be provided to the NFET 110 by a surface contact 140a, or by a backside contact 140b. An aperture 130 is provided in the buried n-well 125 so that the bias potential reaches the NFET 110. In general, a PFET 120 or an NFET 110 will be biased by one of the alternative contacts shown.

In a complex integrated circuit different parts of the circuit may require different bias voltages, and a given part of the circuit may also require a variable bias. A variable bias is particularly desirable when minimum power dissipation is required in a circuit.

SUMMARY OF INVENTION

Thus, a need exists for a bias voltage source for use in CMOS integrated circuits that provides a variable output that can be controlled to minimize power dissipation in the biased device.

Accordingly, embodiments of the present invention provide charge pump circuits that may be used for biasing PFETs and NFETs. Two charge pump arrays are used under common control to provide bias to a CMOS circuit.

In one embodiment of the present invention, a first array of basic charge pump units are connected in parallel to provide bias for an N-well. The input of the first array is connected to a first output of a clock divider circuit having a first selectable output frequency. A second array of basic charge pump units are connected in parallel to provide bias for a P-type substrate. The input of the second array is connected to a second output of the clock divider circuit having a second selectable output frequency.

In another embodiment, one or more of the basic charge pump units making up the aforementioned first and second charge pump arrays has an enable input allowing its output current contribution to be added or subtracted from the total array output.

In a further embodiment, charge pump controller is coupled to a dual output charge pump circuit having a first output coupled to an N-well and a second output coupled to a P-type substrate. A single supply voltage and a single clock frequency input are provided to the dual output charge pump circuit. An output monitor providing feedback may be coupled between the outputs of the dual output charge pump circuit and the charge pump controller.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

Prior Art

DESCRIPTION OF THE PREFERRED EMBODIMENTS

In the following detailed description of the present invention, a variable output charge pump circuit, numerous specific details are set forth in order to provide a thorough understanding of the present invention. However, it will be obvious to one skilled in the art that the present invention may be practiced without these specific details. In other instances well known methods, procedures, components, and circuit elements have not been described in detail as not to unnecessarily obscure aspects of the present invention.

Figure 2:
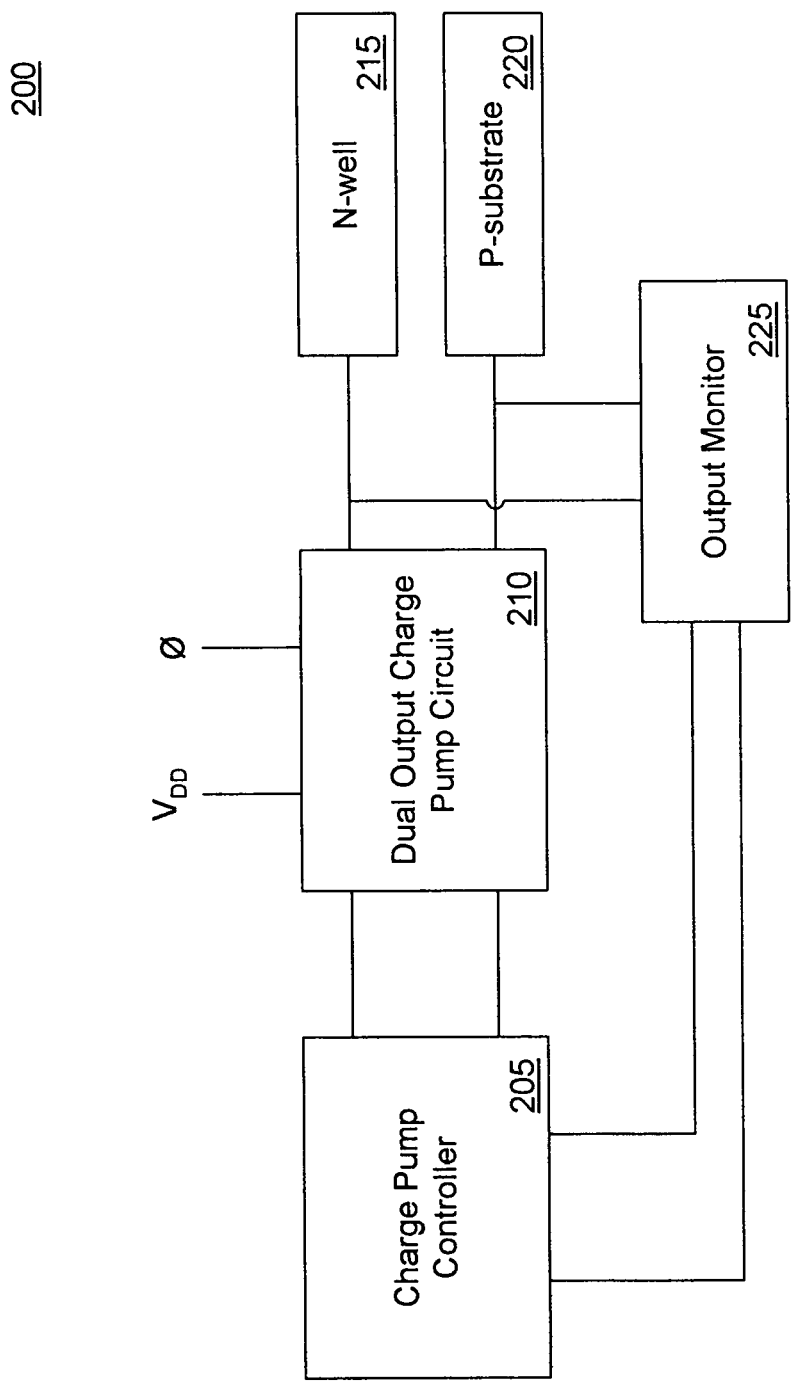
FIG. 2 shows a diagram of a dual variable output charge pump circuit for CMOS circuits in accordance with an embodiment of the present claimed invention.

FIG. 2 shows a diagram 200 of a dual variable output charge pump circuit for CMOS circuits. A charge pump controller 205 provides control of a dual output charge pump circuit 210. The dual output charge pump circuit 210 has a supply voltage input $V_{DD}$ and a primary clock frequency input $\phi$. The dual output charge pump circuit 210 includes a number of capacitors that are switched at a frequency derived from $\phi$. The number of capacitors being charged and the charging frequency are controlled by the charge pump controller 205.

The dual output charge pump circuit has two outputs that are independently controlled, with the first output being used to bias a substrate (e.g., P-type substrate 220) and the second output being used to bias a complementary well resident in the substrate (e.g., N-well 215).

Figure 1:
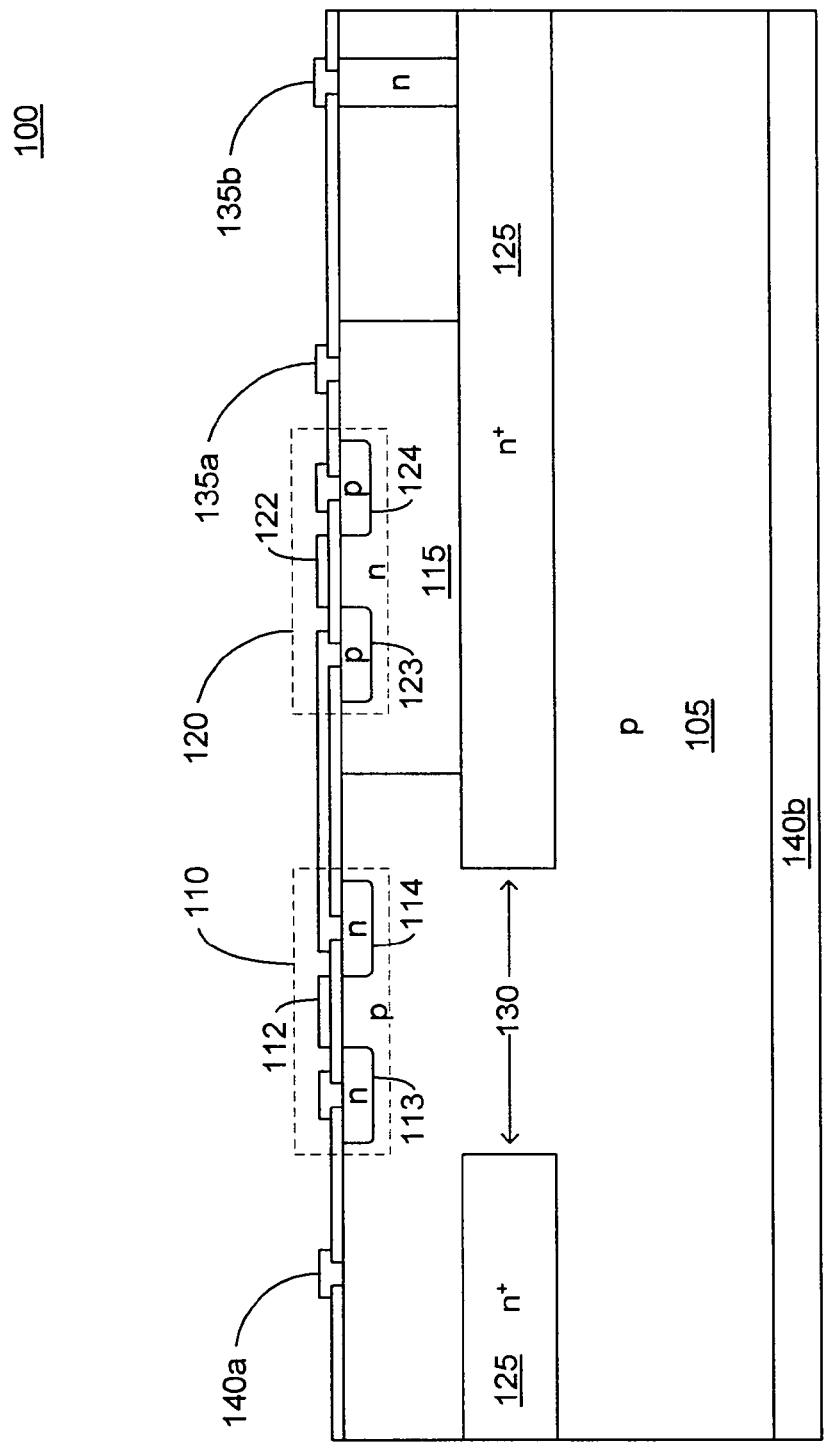
FIG. 1 shows a conventional CMOS inverter with bias connections for a P-type substrate and an N-well.

The inverter shown in FIG. 1 is a basic building block for logic circuits. In an embodiment of the present invention, N-well 215 may correspond to N-well 115 and P-type substrate 220 may correspond to P-type substrate 105. Power dissipation in a CMOS inverter may be reduced by controlling the bias of the PFET and NFET. Thus embodiments of the present invention may be used to reduce power dissipation in integrated circuits such as microprocessors.

The charge pump controller 205 of FIG. 2 may be a dedicated programmable logic circuit, or it may be a general purpose microprocessor that executes instruction for controlling the a dual output charge pump circuit 210 in addition to performing other functions. The N-well 215 and P-substrate 220 may include transistors that are part of the charge pump controller 205.

An output monitor 225 may be used to provide feedback from the outputs of the dual output charge pump circuit 210 and the charge pump controller 205. Typically the operating parameters (e.g. programming) of the charge pump controller will be determined a priori from modeling or previous testing. Feedback from the output monitor 225 allows the outputs of the dual output charge pump circuit to be adjusted. Thus, variations due to processing or temperature may be compensated for.

Figure 3:
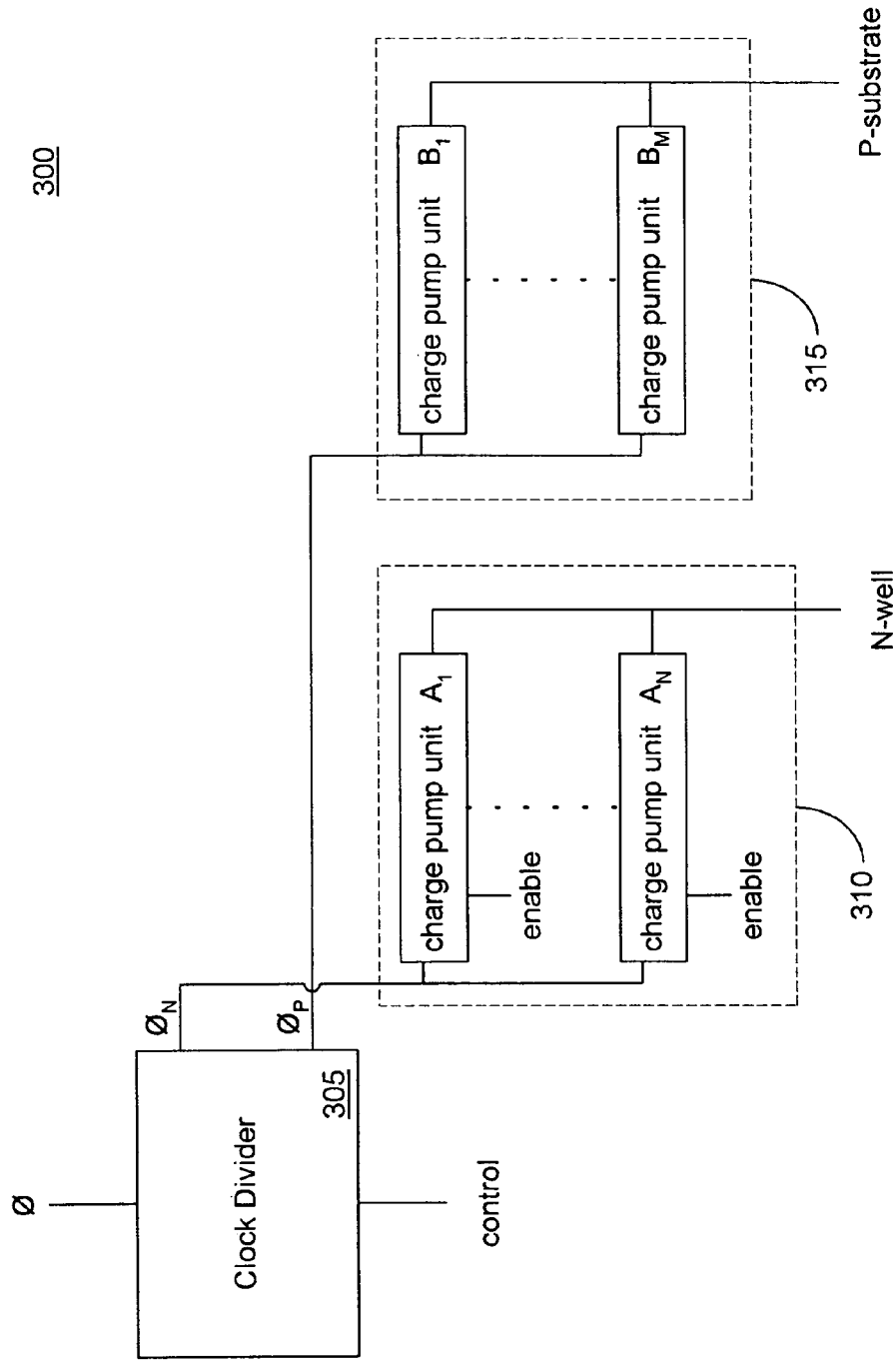
FIG. 3 shows a diagram of a portion of the dual variable output charge pump circuit of FIG. 2, in accordance with an embodiment of the present claimed invention.

FIG. 3 shows an example of the dual output charge pump circuit 210 of FIG. 2. A clock divider 305 has a control input and a primary clock input frequency $\phi$. Basic $V_{DD}$ supply is not shown. The clock divider 305 has a first output $\phi_N$ and a second output $\phi_P$. Each of the two outputs is produced by dividing the primary frequency $\phi$ and are independently selectable.

In one embodiment, the selectable clock divider output frequencies form a binary progression, that is, each of the output frequencies is half or twice the value of another frequency. The output frequencies may be obtained from a series of taps on a sequence of dividers. For example, a series of eight divide-by-two taps could be used to provide a binary progression, and would also provide a frequency output ratio of 256 to 1.

Selectable frequency output $\phi_N$ is coupled to a first charge pump array 310. Charge pump array 310 includes an array of N basic charge pump units $A_1$ to $A_N$ connected in parallel. The basic charge pump unit is preferably a charge pump design that can be implemented using a CMOS process.

Basic charge pump units $A_1$ and $A_N$ each have an enable input; however, some of the units in the array 310 may not have an enable input. The enable input allows the output of each basic charge pump unit to be added or subtracted from the total output of the array 310.

Each of the basic charge pump units $A_1$ to $A_N$ may have the same nominal output, or they may be designed with different output values. For example, a binary progression may be used for the output values, thus providing improved output selection range. For an eight unit array having normalized output values of 1, 2, 4, 8, 16, 32, and 128, the output may be adjusted from 0 to 255 in increments of one. The outputs of the individual basic charge pump units $A_1$ to $A_N$ are connected in parallel and coupled to provide a single bias output (e.g., N-well bias).

A second charge pump array 315 is connected to second selectable frequency output $\phi_P$. The second charge pump array 315 includes an array of basic charge pump units $B_1$ to $B_M$. N and M are integers and may or may not have the same value. Basic charge pump units $B_1$ to $B_M$ are shown without enable inputs and are always operational; however, other basic charge pump units in array 315 may have enable inputs.

In general, the individual size, number, and enablement of basic charge pump units within array 310 or 315 will be determined by the range and resolution requirements for the array. Typically, the requirements for well bias will be different from the requirements for substrate bias.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the Claims appended hereto and their equivalents.

The invention claimed is:

1. A variable output charge pump circuit comprising:
   a first array comprising a plurality of charge pump units coupled in parallel, said first array further comprising a first array common input and a first array common output, wherein each charge pump unit of said plurality of charge pump units of said first array comprises a respective enable input, said enable input for allowing a current contribution from a respective said charge pump to be added or subtracted to said first array variable common output;
   a second array comprising a plurality of charge pump units coupled in parallel, said second array further comprising a second array common input and a second array common output; and
   a clock divider operable to provide a plurality of selectable frequencies, said clock divider comprising a primary frequency input, a first selectable frequency output coupled to said first array common input, wherein said charge pump units of said first array are configured to switch at said first selectable frequency derived from said clock divider, and a second selectable frequency output coupled to said second array common input, wherein said charge pump units of said second array are configured to switch at said second selectable frequency derived from said clock divider.

2. The variable output charge pump circuit of claim 1, wherein at least one charge pump unit of said second array does not comprise an enable input such that said charge pump is configured to be always operational and added to said second array common output.

3. The variable output charge pump circuit of claim 1, wherein the nominal output ratios of charge pump units in said first array comprise a binary progression.

4. The variable output charge pump circuit of claim 1, wherein the nominal outputs of the charge pump units in said first array are analogous.

5. The variable output charge pump circuit of claim 1, wherein the number of charge pump units in said first array is different from the number of charge pump units in said second array.

6. The variable output charge pump circuit of claim 1, wherein the frequencies of the selectable frequency outputs comprise a binary progression.

7. The variable output charge pump circuit of claim 1, wherein the highest and lowest selectable frequencies have a ratio of 256 to 1.

8. A CMOS programmable variable output charge pump circuit comprising:
   a charge pump controller comprising a first control signal and a second control signal;
   a dual output charge pump circuit coupled to said charge pump controller, said dual output charge pump circuit comprising two charge pump arrays, said charge pump arrays comprising a plurality of charge pump units and wherein said first and said second control signals are coupled to said two charge pump arrays respectively;
   an N-well coupled to a first output of said dual output charge pump circuit; and
   a P-type substrate coupled to a second output of said dual output charge pump circuit.

9. The CMOS programmable variable output charge pump circuit of claim 8, wherein said charge pump controller is a microprocessor.

10. The CMOS programmable variable output charge pump circuit of claim 9, further comprising an inverter configured for biasing by said dual output charge pump circuit.

11. The CMOS programmable variable output charge pump circuit of claim 8, further comprising an output monitor coupled between said charge pump controller and the outputs of said dual output charge pump circuit.

12. The CMOS programmable variable output charge pump circuit of claim 8, wherein said first output is coupled to said N-well by a buried N-well.

13. The CMOS programmable variable output charge pump circuit of claim 8, wherein said N-well comprises a functional transistor of said charge pump controller.

14. The CMOS programmable variable output charge pump circuit of claim 8, wherein said dual output charge pump circuit comprises:
   a first array of charge pump units coupled in parallel and coupled to said first output, wherein each charge pump unit of said first array of charge pumps comprises a respective internal enable input, said internal enable input for allowing a respective said charge pump to be added or subtracted to a common output of said first array;
   a second array of charge pump units coupled in parallel and coupled to said second output; and
   a clock divider comprising a primary frequency input, a first selectable frequency output coupled to said first array, and a second selectable frequency output coupled to said second array.

15. An integrated circuit comprising:
   a microprocessor;
   a charge pump controller;
   a dual output charge pump circuit coupled to said charge pump controller wherein said dual output charge pump circuit comprises:
      a first array of charge pump units coupled in parallel and coupled to said first output, wherein each charge pump unit of said first array of charge pumps comprises a respective internal enable input, said internal enable input for allowing a respective said charge pump to be added or subtracted to a common output of said first array;
      a second array of charge pump units coupled in parallel and coupled to said second output; and
      a clock divider comprising a primary frequency input, a first selectable frequency output coupled to said first array, wherein said charge pump units of said first array are configured to be switched at said first selectable frequency derived from said clock divider, and a second selectable frequency output coupled to said second array, wherein said charge pump units of said second array are configured to be switched at said second selectable frequency derived from said clock divider;
   an N-well coupled to a first output of said a dual output charge pump circuit; and
   a P-type substrate coupled to a second output of said a dual output charge pump circuit.

16. The integrated circuit of claim 15, wherein said microprocessor comprises an inverter configured for biasing by said dual output charge pump circuit.

17. The integrated circuit of claim 15, further comprising an output monitor coupled between said charge pump controller and the outputs of said dual output charge pump circuit.

18. The integrated circuit of claim 15, wherein said first output is coupled to said N-well by a buried N-well.

19. The variable output charge pump circuit of claim 15, wherein at least one charge pump unit of said second array does not comprise an enable input such that said charge pump is configured to be always operational and added to said second array common output.

* * * * *

UNITED STATES PATENT AND TRADEMARK OFFICE
CERTIFICATE OF CORRECTION

| | | |
|---|---|---|
| PATENT NO. | : 8,350,616 B1 | Page 1 of 1 |
| APPLICATION NO. | : 10/712522 | |
| DATED | : January 8, 2013 | |
| INVENTOR(S) | : Fu et al. | |

It is certified that error appears in the above-identified patent and that said Letters Patent is hereby corrected as shown below:

On the Title Page, Item [73], insert -- Intellectual Ventures Funding LLC, Carson City, NV (US) --.

Signed and Sealed this
Sixth Day of August, 2013

Teresa Stanek Rea
*Acting Director of the United States Patent and Trademark Office*